United States Patent [19]

Clements et al.

[11] 4,019,534
[45] Apr. 26, 1977

[54] NEEDLE VALVE ASSEMBLY
[75] Inventors: Thomas W. Clements, Ambler; E. Craig Waters, Lansdale, both of Pa.
[73] Assignee: Will Ross, Inc., Milwaukee, Wis.
[22] Filed: Oct. 6, 1975
[21] Appl. No.: 619,748
[52] U.S. Cl. .................... 137/614.18; 251/368; 251/205
[51] Int. Cl.² .......................... F16K 1/52
[58] Field of Search ............ 251/205, 368; 137/625.3, 625.38, 625.39, 614.18

[56] References Cited
UNITED STATES PATENTS

| 1,230,777 | 6/1917 | Quandt et al. | 137/625.38 |
| 1,919,856 | 7/1933 | McGeorge | 137/625.39 |
| 2,944,567 | 7/1960 | Jaskerzec | 137/625.3 |
| 3,067,768 | 12/1962 | Burg | 251/205 X |
| 3,910,553 | 10/1975 | Boylan | 251/205 |

FOREIGN PATENTS OR APPLICATIONS

| 12,596 | 6/1903 | United Kingdom | 137/625.38 |

Primary Examiner—Arnold Rosenthal
Attorney, Agent, or Firm—John A. Dhuey

[57] ABSTRACT

A low flow needle valve assembly is described having a non-metallic valve stem guide and a cross-flow system such that fluid flow occurs over only metallic metering surfaces. The valve assembly is particularly advantageous in view of its low cost and its smooth, non-reversing flow characteristics which result in precise control of extremely low fluid flow rates.

11 Claims, 2 Drawing Figures

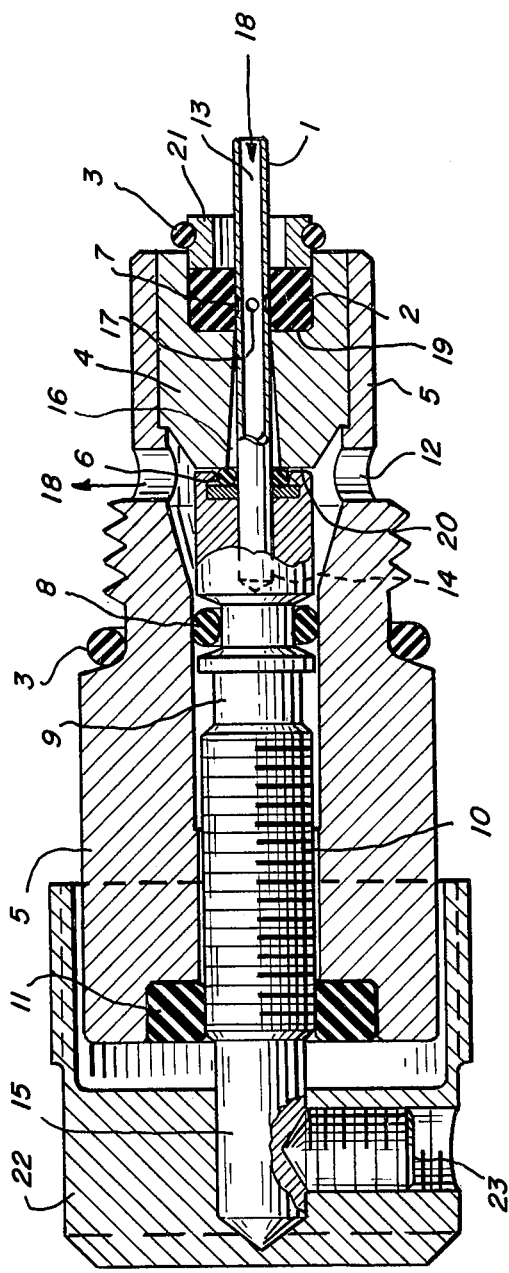
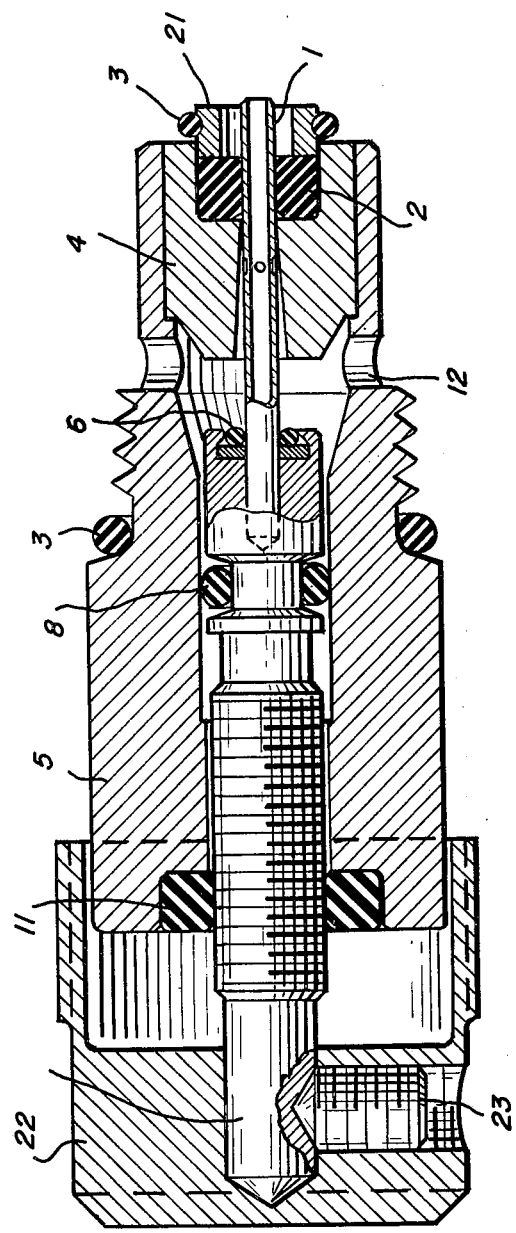
FIG. 1
FIG. 2

NEEDLE VALVE ASSEMBLY

Precision needle valves generally have been manufactured from carefully machined metallic valve stems and orifices. In low flow applications, wherein the flow area between the valve stem and the orifice is very small, even extremely small changes in the axial location of the valve stem with respect to the orifice can greatly affect flow parameters and markedly affect the flow rate. The effects of mechanical eccentricity between the valve stem and the orifice generate an undesirable phenomenon generally called "saw-toothing", i.e. as the valve is opened or closed to vary flow rate, the curve of flow rate versus valve turns exhibits both positive and negative slopes resembling the teeth of a saw. This phenomenon particularly is undesirable in motor-driven flow control valves because of the effects of such ambiguity on flow controller sensing and response. Previous attempts at valve stem guiding to eliminate such undesirable effects usually have resulted in the need to have a valve stem closely fitted in a long metallic orifice of about 5–10 diameters in length. The unavoidable mechanical eccentricities in such a design place such substantial side (radial) forces on the stem orifice combination as to cause severe problems in sticking and seizing to the point where the valve can become inoperable.

Attempts have been made to avoid the sticking and seizing problem by forming the long metering ofiffice from non-metallic materials, e.g. Teflon (polytetrafluoroethylene). Results have not been satisfactory as non-metallic surfaces are susceptible to cold-flow and are dimensionally unstable to the point of affecting flow rate so it cannot accurately be controlled. Furthermore, it has been standard practice to place a resilient seal e.g. an O-ring, over the flow orifice. In such a configuration, when the valve is opened initially, flow occurs immediately with the resilient seal itself operating as a metering surface. Such operation is undesirable and impractical to control very low flow rates since the resilient seal will change dimensionally to a certain extent during an initial period of time with resultant change in flow rate.

The present invention eliminates the above-noted deficiencies and other disadvantages of presently available valves without the high cost associated with the use of a multitude of difficult-to-manufacture parts.

The invention will be described with reference to FIG. 1, which is a cross-sectional view of the instant valve assembly in its preferred embodiment and shown in a closed position, and FIG. 2, wherein the valve assembly is in its open position.

The valve assembly comprises a tubular housing 5 having a valve stem holder 9 joined to a valve stem 1, a valve stem guide 2, and an orifice plug 4 concentrically arranged therein. Valve stem 1 consists of a tube, preferably metallic, having a smooth, round external diameter, and hollow throughout its length. Cross-holes 17 traverse the wall of valve stem 1 and connect the internal tube passage 13 with a circumferential groove 7 formed on the outer surface of valve stem 1. Cross-holes 17 are located axially along valve stem 1 at a position opposite valve stem guide 2 when the valve is in its closed position. In that position, valve stem guide 2 operates to shut off any flow through cross-holes 17.

Valve stem 1 is held mechanically and in a leaktight manner at one end in valve stem holder 9 at their common juncture 14 by any of several conventional adhesives suitable for joining metals. Stem holder 9 is externally threaded at the end opposite the valve stem juncture 14 and threadedly engages internally threaded portion 10 of housing 5. Thus, stem 1 is forced to rotate and traverse as the stem holder 9 is rotated and axially traverses in housing 5 from a first closed position at which no fluid flow occurs to a second position at which fluid flow can take place. Valve stem 1 extends outwardly from housing 5 through valve stem guide 2 with a slight interference fit. Valve stem guide 2 preferably is made from a semi-rigid material which is resilient enough to seal cross-holes 17 and yet is rigid enough to retain valve stem 1 in an axially aligned position. Examples of suitable materials are polytetrafluroethylene (Teflon), polyethylene, polyvinylchloride, nylon, Delrin, Penton and Kymar. Polytetrafluoroethylene particularly is preferred. Other useful materials are styrene ABS, styrene acrylonitrile, cellulose acetate, ethyl cellulose, cellulose acetate butyrate, cellulose propionate, polypropylene, polyurethane, orlon (chlorinated polyether), chloro-trifluorethylene and vinyl chloride.

Valve stem guide 2 is press-fitted into an orifice plug 4 which is located between valve stem guide 2 and valve stem holder 9. Orifice plug 4 forms a tapered annular opening 16 relative to valve stem 1. Generally orifice plug 4 is formed of a metallic material, e.g. stainless steel, and the inner taper is formed in practice by machining with a dimensionally accurate tapered reamer. Typically, tapers on the order of 15 minutes to 10° have been employed, but the invention is not limited thereto. At the juncture 19 between valve stem guide 2 and orifice plug 4, the tapered orifice 16 reduces to the external diameter of valve stem 1.

A positive shut-off seal 6 is located at the end of valve stem holder 9 and provides a seal between orifice plug 4 and stem holder 9. The seal conveniently may be an O-ring or other conventional seal. An annular Teflon (polytetrafluoroethylene) ring has been found to be very satisfactory. Also provided is a seal 8 between valve stem holder 9 and housing 5. Seal 8 is a rotating sliding seal to prevent leakage to the atmosphere through the threads at 10 while the valve is operated by external operating means such as a manual knob or a driving motor or cable. An 0-ring seal has been found to be completely satisfactory. Additionally, O-rings 3 are provided for sealing any possible leakage to the atmosphere at appropriate sealing surfaces machined into body pieces, not shown, into which the valve assembly may be screwed or fastened. The O-ring 3 located at the inlet end of housing 5 conveniently is seated in an annular member 21 which is press-fitted into the end of valve stem guide 2.

Outlet 12 is provided in housing 5, and flow proceeds generally in the direction of arrows 18 from a fluid source through internal tube passage 13, cross-holes 17, groove 7 and tapered annular opening 16 to outlet 12.

Non-repeatability and flow rate drift are eliminated by means of a friction disc or washer 11 pressfitted into body 5 such that the valve stem holder threads at 10 are a slight interference fit with the internal diameter of the friction washer 11 which is preferably made of low density polyethylene. Such a material is capable of maintaining a friction fit on threads 10 because of its resilient properties. Because of the interference fit, there is no effect from thread looseness in the body 5, no drift from vibration effects, and no flow rate error or change caused by side thrust on the adjusting knob during operation. An adjusting knob is not shown but in practice is usually mounted on valve stem holder extension 15 and can easily be subjected to hand pressure. It is therefore of importance to eliminate the effects of such hand pressure especially when it is desired to adjust the valve to extremely low rates of flow.

In operation, as the valve stem holder is rotated and traverses from the closed position toward an open position the following sequence of events occurs: (a) The tight, shut-off seal 6 departs the orifice plug sealing surface 20 while the valve stem annular groove 7 is still engaged in its interference fit in valve stem guide 2, and no flow of any consequence is possible through the valve. (b) As rotation continues, the leading side of the valve stem annular groove 7 passes the valve stem guide-orifice plug juncture 19 and begins to emerge into the tapered annular orifice 16. This means that flow can now begin to occur, entering flow passage 13 in valve stem 1, proceeding to cross holes 17, thence into annular groove 7, thence through the annular space 16 between the external diameter of valve stem 1 and the internal diameter of the tapered orifice 16, thence through passage 12 in the body 5 toward the outlet.

It is important to note that the metering surfaces are not in the cold-flow susceptible and otherwise dimensionally unstable surfaces of the plastic valve stem guide nor in the surfaces of the elastomeric tight shut-off seal 6 but solely between metallic surfaces of the tapered orifice 16 and the valve stem 1 external diameter. This, in conjunction with and as a result of the sequence of events, is extremely important in the controlling of very small fluid flows, e.g. 1 or 2 ml. per minute of such light gases as helium and/or hydrogen and like flow rates of low viscosity and low specific gravity liquids such as gasoline.

It is to be noted that valve stem guide 2 not only serves to block flow in the closed or near closed position until the valve stem annular groove reaches the solid metallic metering tapered orifice juncture 19 but, owing to its interference type diametral fit with valve stem 1, serves also to center and guide valve stem annular groove 7 in a slideable manner as valve stem 1 rotates and axially traverses during operation of the valve.

Because of the straight valve stem 1, and the tapered orifice 16, the only possible point of metal-to-metal contact between the two is at the juncture 19 where the tapered orifice is basically size to size with the external diameter of the valve stem 1. Thus, because of the resilient nature of valve stem guide 2, mechanical eccentricities which generally result in angular misalignments will not result in sticking and seizing of the valve stem 1 in the orifice plug 4. It is obvious that at the same time valve stem guiding is not sacrificed.

It should be appreciated that the flow direction can equally well be opposite to that described and that other materials may be substituted for those listed or mentioned in this description without departing from the spirit of this invention. In addition, it should be understood that different flow characteristics, maximum flow rates, etc., can easily be obtained as desired by using different diameter valve stem diameters and different tapers in the tapered orifice section 16. Non-linear tapers may be employed to give unusual flow rate versus valve turns characteristics.

What is claimed is:

1. A valve body assembly comprising a housing, a valve stem holder axially movable within said housing between a first position and a second position, a hollow, tubular valve stem secured to said valve stem holder and extending outwardly from said housing, a valve stem guide retained between said housing and said valve stem, and an annular orifice plug retained between said valve stem and said housing and between said valve stem guide and said valve stem holder, said orifice plug having an inner taper forming a tapered orifice between said valve stem and said plug, said valve stem having a cross-flow channel through the wall thereof and a continuous circumferential groove on the outer surface thereof in fluid communication with said channel, whereby when said valve stem holder is at said first position, said groove is sealingly retained within said valve stem guide, and when said valve stem holder is at said second position, said groove is in fluid communication with said tapered orifice.

2. An assembly as in claim 1 wherein said valve stem holder threadedly engages said housing.

3. An assembly as in claim 2 wherein resilient sealing means are provided between said housing and said valve stem holder at said thread engagement.

4. An assembly as in claim 1 further comprising releasable sealing means between said valve stem holder and said annular insert.

5. A valve body assembly comprising a housing, a valve stem holder axially movable within said housing, a hollow, tubular valve stem secured to said valve stem holder and extending outwardly from said housing, a valve stem guide retained between said housing and said valve stem, and an annular orifice plug retained between said valve stem and said housing and between said valve stem guide and said valve stem holder, said orifice plug having an inner taper forming a tapered orifice between said valve stem and said plug, said valve stem having a cross-flow channel through the wall thereof and also a continuous circumferential groove on the outer surface thereof in fluid communication with said channel at a position such that under conditions of no flow, said channel is closed by said valve stem guide and under flow conditions, said channel is in fluid communication with said tapered orifice, said valve stem and said orifice plug being metallic and said valve stem guide being formed from polytetrafluoroethylene, nylon, polyethylene or polyvinylchloride.

6. An assembly as in claim 5 wherein said valve stem holder threadedly engages said housing.

7. An assembly as in claim 6 wherein resilient sealing means are provided between said housing and said valve stem holder at said threaded engagement.

8. An assembly as in claim 5 further comprising releasable sealing means between said valve stem holder and said annular insert.

9. A valve body assembly comprising a generally tubular housing, a valve stem holder axially movable within said housing and threadedly engaging one end thereof, a hollow, tubular valve stem secured to said valve stem holder and extending outwardly from said housing, a semirigid, resilient valve stem guide retained between said housing and said valve stem, an annular orifice plug retained between said valve stem and said housing and between said valve stem guide and said valve stem holder, said orifice plug having an inner taper forming a tapered orifice between said valve stem and said plug, releasable sealing means disposed between said valve stem holder and said insert, said valve stem having a cross-flow channel through its wall in communication with a circumferential groove on the outer surface of said valve stem at an axial position such that said valve stem guide closes said groove when said valve stem holder is in its closed position and said groove is in fluid communication with said tapered orifice when said valve stem holder is in an open position.

10. An assembly as in claim 9 wherein resilient sealing means are provided between said valve stem holder and said housing at the point of threaded engagement.

11. An assembly as in claim 10 wherein said valve stem and said annular orifice plug are metallic and said valve stem guide is formed from polytetrafluoroethylene, polyethylene, polyvinylchloride or nylon.

* * * * *